Oct. 15, 1935.   J. P. PETERS   2,017,605
APPARATUS FOR MECHANICALLY FOLDING OVER THE
SIDE FLAPS OF A SHEET OF DOUGH
Filed Jan. 27, 1934   2 Sheets-Sheet 1

J. P. Peters
INVENTOR

By Marks & Clark
Attys.

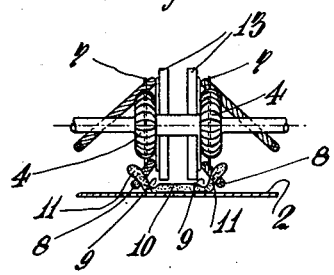
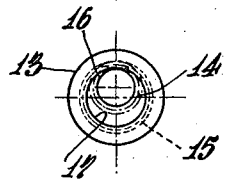
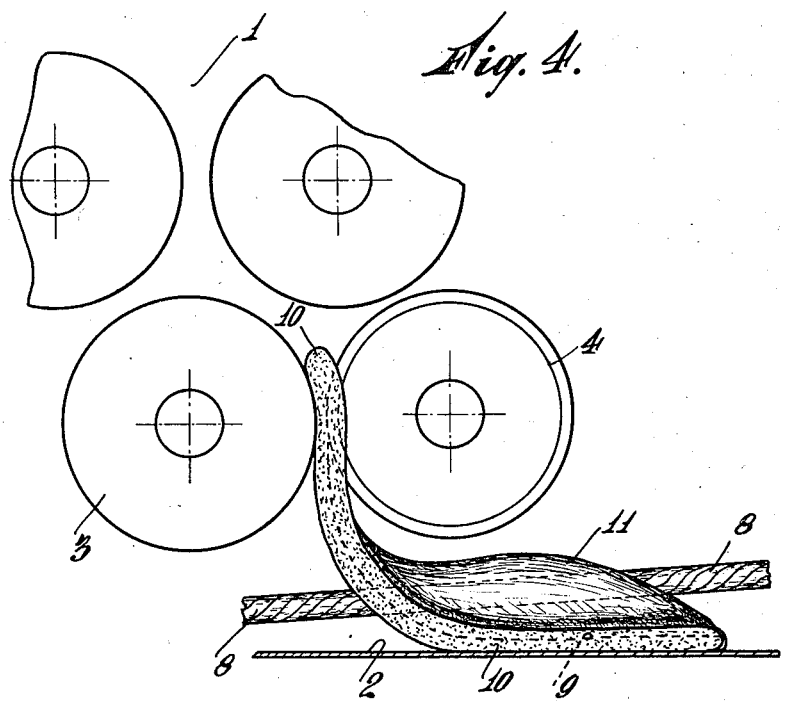

Patented Oct. 15, 1935

2,017,605

UNITED STATES PATENT OFFICE 2,017,605

APPARATUS FOR MECHANICALLY FOLDING OVER THE SIDE FLAPS OF A SHEET OF DOUGH

Johannes Philippus Peters, Rotterdam, Netherlands

Application January 27, 1934, Serial No. 708,635
In the Netherlands January 31, 1933

9 Claims. (Cl. 107—12)

The invention relates to an apparatus for mechanically folding over the side flaps of a sheet of dough, and has for its purpose to provide simple means for carrying out and facilitating this operation.

It has been proved in practice that no satisfactory results are obtained for continuous production with the known apparatus for folding over the side flaps of a sheet of dough, either by means of conical or cylindrical rollers, or by means of conveyor belts.

An apparatus according to the invention fills this need; it is charcterized by a conveyor and by rope-shaped folding-over members, the working portions of which are driven in the same direction as the conveyor, the said ropes having a round, an approximately round or a regularly polygonal cross section and, when viewed from above, being converging in the direction in which the conveyor is driven, whilst the working portions of the ropes at the place where their mutual distance is greatest, are located below the device for the pre-working, at least the forwarding of the sheet of dough.

The ropes will catch the side flaps of the sheet directly after their delivery by the flattening mechanism and let down the body or the central portion of the sheet, until it rests on the conveyor (belt or drum), so that the sheet is immediately sufficiently supported and the folding-over device will require less space, as it may extend in part below the roller mechanism. Because of this it is possible to build the machine shorter and lower. Moreover the sheet of dough will remain lying always in the right direction.

According to the present invention the working portions of the ropes are preferably placed so that they are diverging from the conveyor when viewed in the direction of the movement of the said conveyor.

A particularly compact construction may be obtained, when, according to the invention, the ropes at the place where they are nearest to each other, are passed over vertical rollers, and over horizontal pulleys at the opposite place. The driving is done preferably by means of the vertical pulleys.

It is advisable to construct the device so that, viewed widthwise of the machine, next to the pulleys for the ropes which have the lesser spacing, there are provided one or more discs or other pressing members, or the pulleys for the ropes are so constructed as to press the folded-over flaps tightly onto the body of the sheet of dough. The use of such discs or other pressing members will prevent the folded-over flaps to unfold themselves at the back portion when the sheet afterwards is evenly flattened out, thus imparting an undesired shape to the sheet. It will also prevent that the dough will get entangled between the pulleys and the ropes.

In order to adapt the device to loaves of different lengths, it is sufficient to alter the mutual spacing of the ropes, or of the working portions of the same, which may be carried out in a simple manner.

The machine is rendered still more effective, when according to the invention there are provided above the receiving portion of the ropes, members which are located in the path of the sheet of dough in such a way as to form grooves into the said sheet at the places where it is to be folded over.

In this manner the sheet will come down more readily into the desired shape and it will be easier to fold over the side flaps. The greatest advantage, however, is that in this way it is possible to obtain sheets of dough of exactly equal lengths, which is important in manufacturing so-called long loaves. Finally the side flaps will always be of equal size, which will cause the dough in the finished product to be more evenly distributed than has been hitherto the case.

According to the invention the grooving members may each consist of a rotating grooving roller, placed opposite a rotating roller or drum or other conveying means, so that the smallest space portion between said roller and the grooving rollers is less than the overall thickness of the approaching sheet of dough, or less than the outlet of the flattening roller mechanism, through which the dough has been passed previously.

According to the invention the grooving rollers may be located behind said rotating roller or drum, whilst said roller is arranged below a system of sheet forming rollers so that the sheet of dough delivered by the latter is caught by the said roller and fed to the grooving rollers, the unit formed by said roller and said grooving rollers being located at a short distance above the ropes and the conveyor.

The ropes may be adjustable as one unit together with the grooving rollers, or they may be adjustable locally, as a unit, according to the desired width of the piece of dough to be shaped and in dependence on the width of the approaching sheet of dough.

The invention by way of example will be further explained by means of a preferred embodiment represented in the accompanying schematic drawings.

Fig. 3 is a cross section along the line III—III of Fig. 1.

Fig. 4 is a partial longitudinal section of a portion of the device.

Fig. 5 shows a detail of a modified embodiment.

Figure 1:
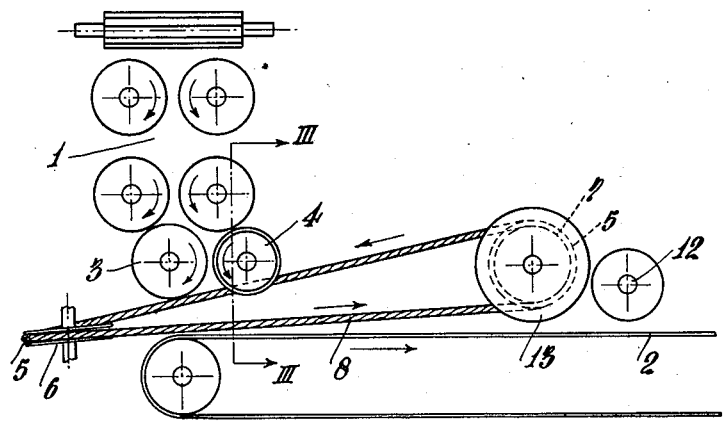
Fig. 1 is a side elevation of the front part of a machine for shaping loaves constructed according to the invention.

According to the drawings a sheet forming roller mechanism 1 comprising three pairs of rollers is arranged at a short distance above a conveyor belt 2, which belt will convey the sheet of dough delivered by the system of sheet forming rollers to a rolling-up mechanism and/or a mechanism for elongating a roll or scroll of dough (not shown).

Between this system of rollers and the said belt there is arranged a receiving roller 3, which catches the arriving sheet of dough and moreover guides the same downwardly to the right, said roller at the same time serving as a counter-roller for e. g. wooden grooving rollers 4. The said grooving rollers 4 are both spaced some distance apart, behind the roller 3, so that they will form two parallel grooves into the passing sheet of dough in such a way that the flaps thus formed may fold over by their own weight. The side surfaces of the rollers merge into the circumferential portion without sharp edges.

Below the pair of rollers 4 there are provided a pair of ropes 5 made of round leather or of a different round or approximately round material, the said cords serving as a receiving and at the same time folding-over and pressing down means. Said ropes are passed over pairs of vertical driving pulleys 6 and horizontal pairs of pulleys 7.

The ropes are driven in such a direction that their lower portions 8 will move in the same direction and with the same speed as the upper portion of the conveyor belt 2.

Figure 2:
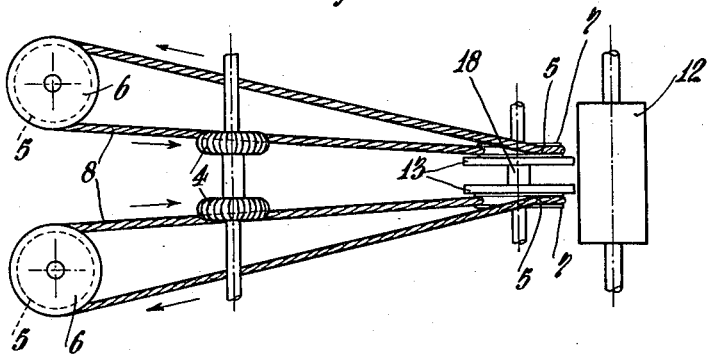
Fig. 2 is a plan view of that portion of the machine comprising the invention.

The relative position of the rollers 4 and the portions 8 is shown in Figures 2, 3 and 4.

The sheet 10 provided with parallel longitudinal grooves 9 arriving from between the roller 3 and the grooving rollers 4 will sag down immediately until its body rests on the conveyor belt 2 and the side flaps are resting directly on the rope portions 8, which causes the side flaps 11, 11 to be lifted up by these rope portions at the place of the grooves 9, 9. This has proved in practice to be accomplished very readily and with security, the grooves applied in the sheet of dough being of great assistance. The sheet always takes the correct position on the conveyor belt 2 and will remain therein all the time.

Owing to the inclined position and direction of the portions 8 of the ropes, the flaps 11, 11 are automatically folded over, so that they are laid onto the body of the sheet of dough at the moment at which the sheet reaches the pulleys 7, 7. When arrived at that place, the folded-over flaps are tightly pressed to the body 10 of the sheet of dough, immediately after which the sheet is flattened to size by means of a reflattening roller 12. The pulleys 7, moreover, keep the dough clear of the ropes and the rope pulleys, so that there is no danger for it to get entangled between the rope and the rope pulleys.

It has been proved in practice that the pressing down onto the body of the sheet of the folded-over side flaps, obviates the danger of their working loose again at the back end during the subsequent flattening out at 12. The result of the treatment of the sheet of dough in the manner described above is that the roll or scroll of dough into which it will be made up later on will show the required "heads" at the ends and that the requirement that the side flaps are to be folded over inwardly, has been met.

This pressing down action of the side flaps onto the body of the sheet of dough may be obtained by means of two discs 13 which are mounted adjacent to and fixed to the rope pulleys 7 and which moreover are of a greater diameter than the latter. It has been proved in practice that although the circumferential speed of the rollers 13 is greater than the speed of the conveyor belt this will not be detrimental to the desired effect. It is also possible to have the circumference of the rollers 13 waved instead of smoothly circular, so that the dough flaps are then more or less locally pressed down.

Figure 5 illustrates how each of the rollers 13 may be constructed for self-pressing action. For this purpose a pinion 14 is rigidly connected to the shaft of the rollers 7, which pinion engages an associated inner gearing 15 of the roller 13. In order to limit the depth of the pressing action the pinion is provided with a supporting rim 16, on which the roller is suspended by means of an edge 17, during the time when there is no dough under the roller. The drive of the pinions 14 may be obtained, as illustrated, by rigidly connecting the same to the shaft 18 of the rope pulleys 7; this however is not absolutely necessary.

The grooving rollers 4 may be driven by means of their shaft. An advantage of the device not hitherto mentioned is that it is also suitable for pre-working and shaping dough for obtaining loaves of different lengths, as for instance for making whole or long loaves or so-called "halves" or short loaves.

The device in a simple manner, may be so constructed that the rope pulleys together with the rollers 4 by means of a single manipulation, may be moved towards or apart from each other according to whether shorter or longer loaves are to be made. The grooves will always be formed at the right places and the ropes will always cause the flaps to fold over properly. The sheets of dough thus obtained are all of the same width for the desired size to which the machine has been adjusted.

I claim:

1. In apparatus for mechanically folding over the said flaps of a sheet of dough, a conveyor and rope-shaped folding-over means located a short distance above the said conveyor, the working portions of the said folding-over means being driven in the same direction as the conveyor, said ropes being of a substantially round cross-section, and when viewed from above, at least as far as their working portions are concerned, are converging in the direction of movement of the conveyor, whilst the working portions of the ropes at the place where they are farthest apart, extend below the device for delivering the sheet of dough and the working portions of the ropes, considered in the direction of the movement of the conveyor, are diverging with regard to the latter.

2. Apparatus according to claim 1 in which the ropes, at the place where they are nearest to each other are passed over vertical pulleys, whereas at the opposite place they are passed over horizontal pulleys.

3. Apparatus according to claim 1 in which considered widthwise of the apparatus and adjacent to those rope pulleys which are nearest to each other, there are provided substantially circular pressure members, arranged or constructed so that they will firmly press the folded-over flaps onto the body of the sheet of dough.

4. Apparatus according to claim 1 means adapted for varying the mutual spacing of the working portions of the ropes.

5. Apparatus according to claim 1, in which above the receiving part of the ropes there are provided members located in the path of the sheet of dough in such manner as to form into the said sheet grooves at the places where it is to be folded over, said grooving members, each consisting of a rotating grooving member located opposite a conveyor member so that the smallest spaced portion between said shoulder and said grooving members is narrower than the over-all thickness of the arriving sheet of dough, and further the grooving rollers being located behind said rotating roller and said roller arranged below a system of sheet forming rollers, so that the sheet of dough delivered by the latter is caught by the said roller and fed to the grooving rollers, the unit comprising said roller and grooving rollers being arranged at a short distatnce above the ropes and the conveyor.

6. Apparatus for mechanically folding over the side flaps of a sheet of dough comprising a conveyor, endless folding over ropes, means for actuating and guiding said ropes so that the working portions of said ropes travel at the same speed and in the same direction just above the conveyor and converge in the direction of travel of the conveyor, means for preshaping and feeding the dough to the conveyor including members located in the path of the sheet of dough for forming grooves in the dough to delimit the portions forming the flaps.

7. Apparatus according to claim 6, in which the grooving members each consists of a rotating grooving roller located opposite a cooperating rotating roller so that the smallest space between said cooperating roller and said grooving rollers is narrower than the outlet opening of the sheet forming roller mechanism through which the dough has been previously passed.

8. Apparatus according to claim 6 in which the means for preshaping and feeding the dough to the conveyor comprises sheet forming rollers, grooved rollers and cooperating rollers adjacent thereto below the sheet forming rollers, and a short distance above the ropes and the conveyor, the grooved rollers being behind the cooperating rollers whereby the sheet of dough is caught by the cooperating rollers and fed to the grooved rollers.

9. The device as claimed in claim 6 in which the ropes are of approximately circular cross section.

JOHANNES PHILIPPUS PETERS.